March 31, 1970     C. A. SCIAMMARELLA     3,503,690

OPTICAL READING APPARATUS FOR MOIRE FRINGE PATTERNS

Filed June 8, 1966     2 Sheets-Sheet 1

Cesar A. Sciammarella
INVENTOR

Cesar A. Sciammarella
INVENTOR.

United States Patent Office 3,503,690
Patented Mar. 31, 1970

3,503,690
OPTICAL READING APPARATUS FOR MOIRE FRINGE PATTERNS
Cesar A. Sciammarella, Gainesville, Fla.
(55 W. 14th St., New York, N.Y. 10011)
Filed June 8, 1966, Ser. No. 556,198
Int. Cl. G01n 21/22
U.S. Cl. 356—205      11 Claims

ABSTRACT OF THE DISCLOSURE

Accurate information retrieval is obtained from film on which a moire fringe pattern is photographed by establishing two light beams respectively intersected by the film being interpreted and an optical attenuating wedge rotated to instantaneously vary the light intensity of the associated beam passing therethrough to balance the light of the beam passing through the film which is moved at a predetermined rate to scan the pattern recorded thereon. Distortion resulting from the nonlinear response of the film when exposed is compensated by a film sample on the optical wedge to obtain an output signal from the balancing circuit that is a linear function of the light intensity distribution of the actual moire fringe pattern image itself.

---

This invention relates to the analysis of strain in structural members by the moire method of stress analysis and more particularly to the interpretation of moire fringe patterns obtained by such methods.

The present invention is concerned with the automatic interpretation of photographs of moire fringe patterns utilized in the analysis of strains. Such fringe patterns are obtained from light passing through a simulated structural member or from light reflected from an actual structural member the strain distribution in which is to be analyzed after such structural member or model is subjected to prescribed stresses. A model grid and a master or reference grid are applied to the surface being tested to produce an interference fringe pattern. The photographic recording of such fringe patterns are then interpreted for strain analysis purposes. Accordingly, it is a primary object of the present invention to provide apparatus through which the photographic recording of the fringe pattern may be automatically and accurately interpreted in accordance with certain relationships between light intensity and its distribution in the fringe pattern.

In accordance with the foregoing object, the apparatus of the present invention will produce electrical outputs capable of being recorded to provide interpreted information regarding the distribution of light intensity of a moire fringe pattern through the recording of its image on an optical record or film.

An additional object of the present invention in accordance with the foregoing object is to provide apparatus for interpreting a photographic film on which a moire fringe pattern is recorded taking into account the reproduction of light intensities on the photographic film in accordance with a nonlinear scale or exposure response so that the output of the apparatus will be a linear function of the light intensity distribution at the image plane of the photographic lens through which the moire fringe pattern is recorded on the film. It will therefore be apparent that the output information obtained from the apparatus of the present invention will represent an accurate interpretation of the light intensity distribution of the fringe pattern.

A further object of the present invention in accordance with the foregoing objects is to provide apparatus which utilizes a dual beam principle and balancing facilities which equalizes the intensity of radiation respectively transmitted through the photographic film being scanned and an optical attenuating wedge the movement of which reflects changes in light intensity of the moire fringe pattern recorded on the film. By incorporating a sample of the photographic film in the optical wedge, its output movement will be linearly related to the light intensity distribution of the moire fringe pattern itself rather than its recording on the photographic film.

A still further object of the present invention in accordance with the foregoing object is to provide apparatus for interpreting moire fringe patterns as recorded on photographic film having facilities for varying the instantaneous area on the photographic film being scanned so as to change the operational mode of the apparatus as either a density sensor or an intensity averaging device. In this manner, the photoreading apparatus may be adjusted to accommodate both fringe recordings that have the grid lines printed thereon and fringe recordings where only the fringes are printed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
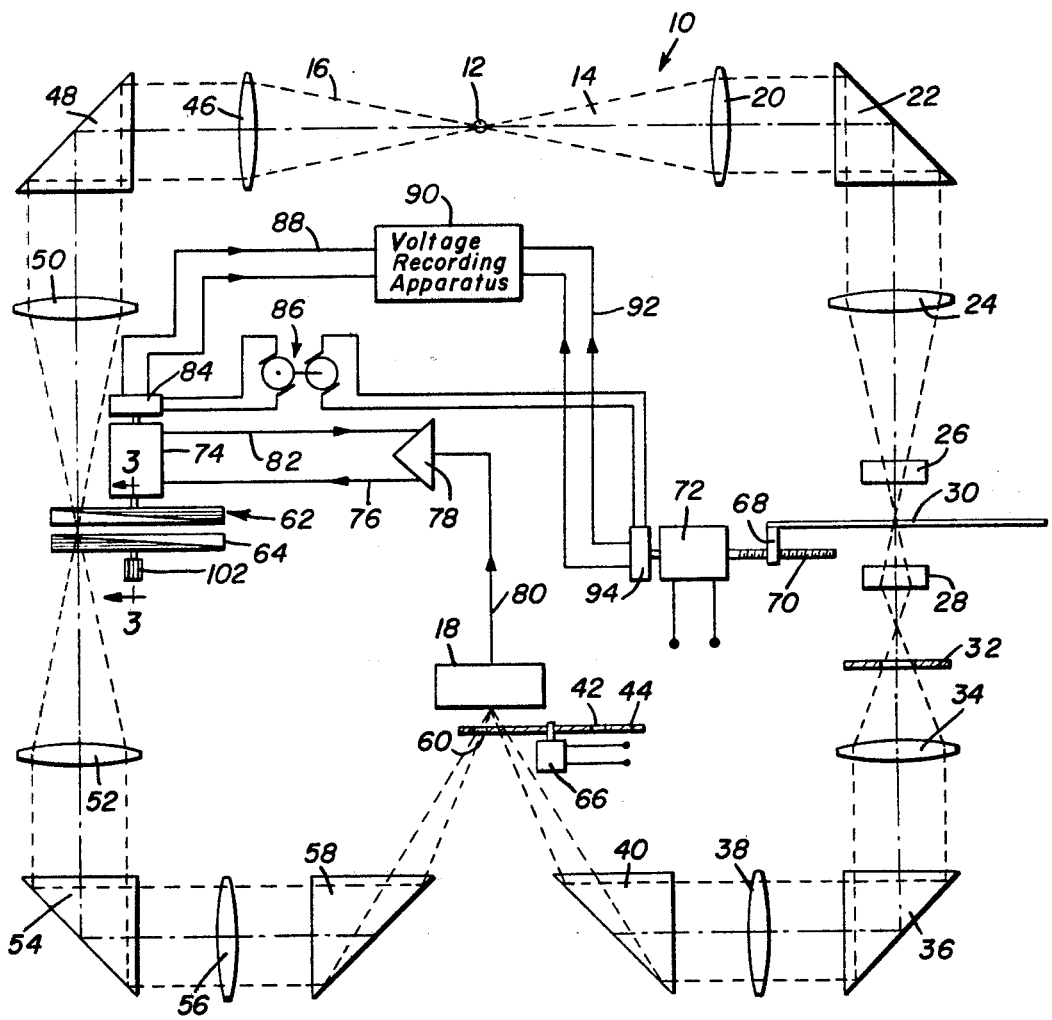
FIGURE 1 is a simplified schematic diagram illustrating the arrangement and operation of the photoreading apparatus of the present invention.

Referring now to the drawings in detail, FIGURE 1 illustrates the operational relationship of components which form the photoreading apparatus generally denoted by reference numeral 10. The apparatus employs a source of radiation such as a lamp 12 diagrammatically shown in FIGURE 1 from which radiation is emitted and transmitted as beams 14 and 16 along two radiation paths to a light sensing or photomultiplier component 18. The radiation beam 14 travels along one path passing through a condenser lens 20 and is reflected through the prism 22 for passage through another condenser lens 24 before being transmitted through a magnification lens combination 26 and 28. Positioned in the path of the converged beam 14 between the lens components 26 and 28, is an optical recording medium such as film 30 on which a moire fringe pattern is recorded for interpretation by the apparatus. The beam emerging from the lens component 28 is passed through the adjustable opening of an iris component 32 and transmitted through the condenser lens 34 to prism 36 from which it is reflected. The beam is then transmitted through the condenser lens 38 to the prism 40 from which it is reflected at the proper angle toward the photomultiplier component 18, passing through an aperture 42 formed in a moving shutter 44 positioned in front of the photomultiplier component. Similarly, the beam 16 is transmitted along a radiation path intercepted by the condenser lens 46, reflecting prism 48, condenser lenses 50 and 52, reflector prism 54, condenser lens 56 and reflector prism 58 from which the beam is directed toward the photomultiplier component 18 through an aperture 60 in the movable shutter 44. The beam 16 between the condenser lenses 50 and 52 is transmitted through optical attenuating means including an angularly movable reference wedge 62 and a selectively movable optical wedge 64.

The intensities of the two beams are alternatively sensed by the photomultiplier component 18 by movement of the shutter 44 so as to alternatively align the apertures 42 and 60 with the two beams. In one form of the invention, rotational movement is imparted to the shutter 44 by means of a synchronous motor 66 as shown in FIGURE 1. The optical system described therefore provides two images of the same source 12 at the photomultiplier component alternatively obscured by the rotating shutter so that the relative energy levels of the radiation beams may be compared and balanced as will be hereafter explained. In this regard, it should be appreciated that the radiation level or intensity of the beam 14 entering the photomultiplier component 18 will depend upon the density or transmittance of the film 30 and the moire fringe pattern recorded thereon since the beam passes through the film. Further, it will become apparent that the intensity of the radiation transmitted by the beam 14 to the photomultiplier component will vary in accordance with continuous movement imparted to the film 30 perpendicular to the optical axis of the beam in order to scan the recorded fringe pattern between spaced locations on the film during an information retrieval period. Movement is imparted to the film by means of a traveling carriage 68 threadedly mounted, by a resilient nut for example, on a lead screw 70 rotatably driven by a synchronous motor 72 so that any error in the pitch of the screw is averaged by the nut.

The intensity of the beam 16 transmitted to the photomultiplier component 18 is attenuated by means of the optical wedge 62 as aforementioned in order to equalize or balance the two beams. Toward this end, the optical reference wedge 62 is rotated so as to expose a varying optical density to the converged beam by means of a servomotor assembly 74. Angular movement is imparted to the reference wedge 62 by the servomotor assembly in response to an amplified signal transmitted to the servomotor assembly through the output signal line 76 of an amplifier component 78 receiving an input signal through line 80 from the photomultiplier component 18. A tachometer generator associated with the servomotor assembly 74 will therefore dispatch a feedback signal through feedback line 82 to the amplifier component 78 in order to produce a null condition when the beam intensities are equalized. The angular movement imparted to the reference wedge 62 in order to balance the beam intensities is converted into an output signal by means of a rotatable precision, wire-wound potentiometer 84 supplied with voltage from a stabilized voltage source 86. Thus, an output voltage signal proportional to any change in intensity between the radiation beams will be fed by the output lines 88 to any suitable voltage recording apparatus 90. Similarly, a voltage signal proportional to the linear displacement imparted to the film 30 by the synchronous motor 72 is supplied by the output lines 92 to the voltage recording apparatus, the output signal voltage lines 92 being connected to a potentiometer 94 driven by the synchronous motor 72 and supplied with electrical voltage from the stabilized voltage source 86.

The arrangement and operation of the apparatus as hereinbefore described is designed to produce an output across the voltage lines 88 for example, representing the instantaneous light intensity over a small surface area which is related to its location in the displacement field being investigated in accordance with the following equation: $I(x) = I_0 + I_1 \cos \rho(x)$, where $I(x)$ is the instantaneous intensity, $\rho(x)$ is a dimensionless relative displacement value, $I_0$ is the average light intensity and $I_1$ is the intensity amplitude of the variable term at a given location. The foregoing equation governs the relationship between displacement and light intensity in a moire fringe pattern which has been derived in connection with research applied to the analysis of strains as indicated in an article "Basic Optical Law in the Interpretation of Moire Patterns Applied to the Analysis of Strains" appearing in the May 1965 issue of "Experimental Mechanics," volume 5, No. 5, authored by the applicant.

Figure 2:
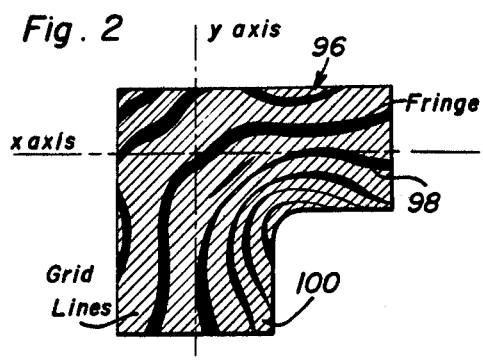
FIGURE 2 illustrates a typical moire fringe pattern recording to be interpreted by the apparatus of the present invention.
Figure 4:
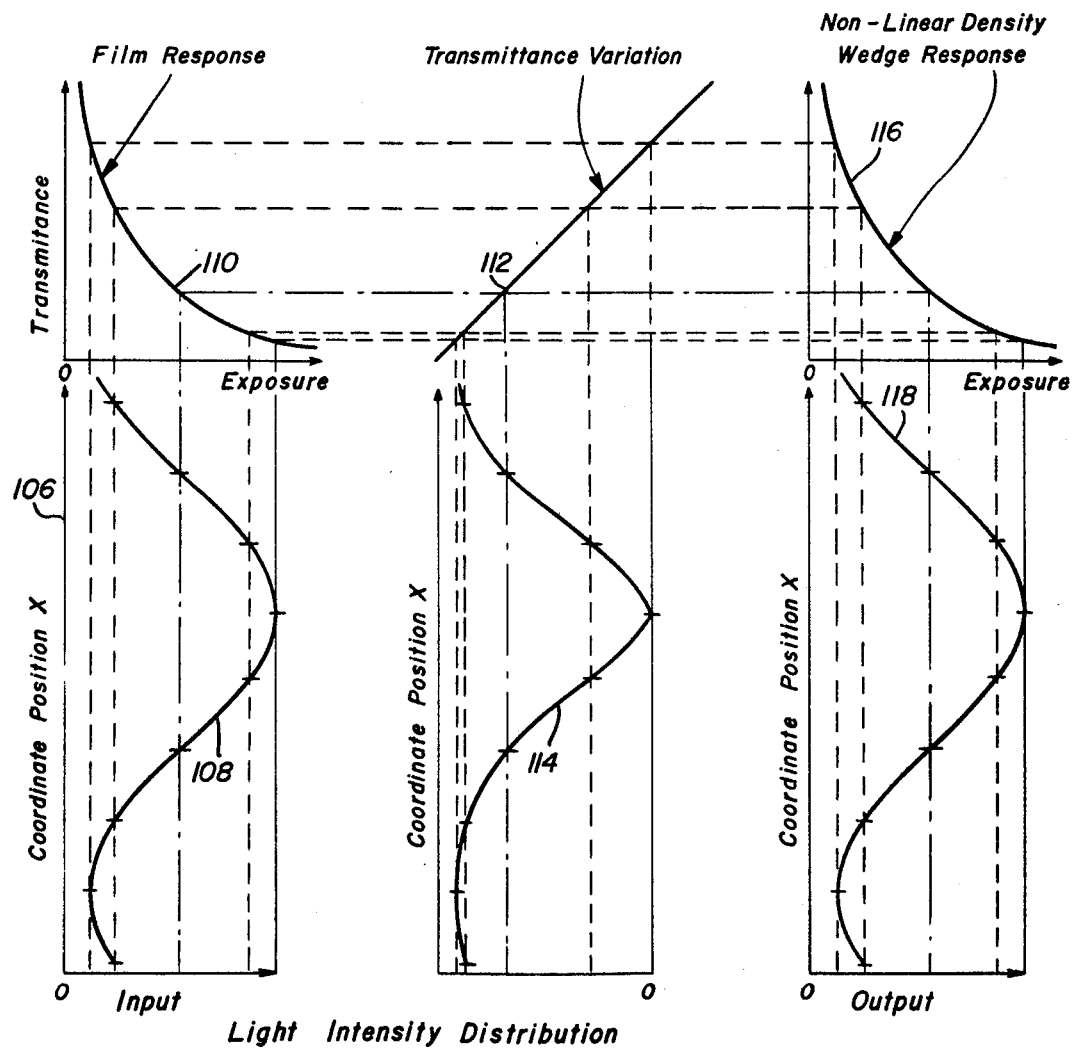
FIGURE 4 is a graphical illustration of the principles utilized in obtaining interpretive information from the apparatus of the present invention proportional to the actual intensity distribution of the moire fringe pattern to be interpreted.
Figure 3:
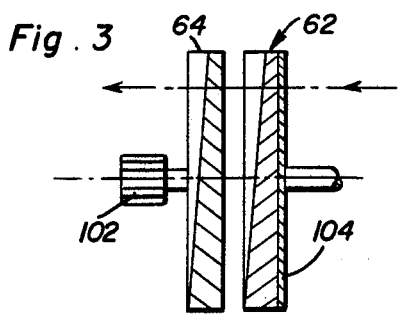
FIGURE 3 is an enlarged, simplified sectional view taken substantially through a plane indicated by section line 3—3 in FIGURE 1.

FIGURE 2 illustrates a typical moire fringe pattern generally referred to by reference numeral 96 with both the fringes 98 and grid lines 100 printed on the film. It will be appreciated therefore, that displacement of the film with the fringe pattern 96 recorded thereon will permit the beam 14 to scan the pattern so as to accordingly vary the light intensity which is balanced by variation in the intensity of the beam 16. Balancing of the beam 16 is accomplished by angular movement of the reference wedge 62 related to displacement of the film 30 in accordance with the aforementioned equation. The apparatus is initially balanced by manual adjustment of the optical wedge 64 through the adjustment knob 102 as shown in FIGURES 1 and 3, effecting angular displacement of the wedge 64 about the rotational axis of the reference wedge 62. Further, the reference wedge 62 has incorporated therewithin a sample 104 of the same type film as film 30 employed to record intensities of the moire fringe pattern in order to compensate for image distortion resulting from nonlinear film response during exposure. The film sample 104 is exposed (without, of course, recording the fringe pattern image) under linearly varying intensity conditions identical to those under which the film 30 is exposed when recording the fringe pattern in order to obtain a linear relationship between the output of the apparatus and the intensity distribution of radiation passing through the fringe pattern at the image plane of the photographic lens through which the fringe pattern is recorded on the film 30. Thus, the sample film 104 is exposed as aforementioned in order to produce a nonlinear density wedge response as depicted by curve 116 in FIG. 4. It will be appreciated in this regard, that the film 30 records intensities in accordance with a nonlinear scale which is compensated for by the apparatus in view of the null technique utilized in balancing the intensities of the two beams 14 and 16. In FIGURE 4, a sinusoidal variation in intensity along a displacement axis 106 is assumed as shown by curve 108 representing intensity distribution at the image plane of the photographic lens which differs from the intensity distribution of the image ordinarily recorded on the film 30 because of the nonlinear exposure response of the film shown by curve 110 in FIGURE 4. In view of the transmittance variation between the input image and the image recording as shown by curve 112, the intensity distribution of the recording depicted by curve 114 is distorted and therefore differs from that of the input intensity distribution shown by curve 108. By correspondingly varying the angular movement response of the reference wedge 62 to changes in intensity of the image recorded on the film 30 in accordance with a nonlinear response characteristic as shown by the curve 116, the output representing such changes in or distribution of intensity will be related to displacement of the field of the model under analysis in accordance with the sinusoidal curve 118 which is proportional the the input curve 108. Thus, the actual intensity distribution of the fringe pattern is recuperated by the apparatus despite the nonlinear intensity recording response of the film.

The photoreading apparatus of the present invention may also operate in two different modes. When the recorded pattern on the film 30 contains moire fringes such as the fringes 98 shown in FIGURE 2 without the grid lines 100 used to produce the pattern, the magnifying lens combination 26 and 28 and the iris 32 are adjusted so that the beam 14 will scan a relatively small area compatible with the graininess of the film. The apparatus may then operate as a density sensor. On the other hand, when the beam 14 is utilized to scan a fringe pattern recording containing the grid lines as shown in FIGURE 2, the magnifying lens combination 26 and 28 and iris 32 are adjusted so that the beam 14 covers a relatively larger area. The apparatus then operates to average local intensities recorded on the film, extending over several grid lines.

I claim:

1. The combination of claim 6 wherein said movement of the balancing means and said displacement of the recording medium are related in accordance with the equation $I(x)=I_0+I_1 \cos \rho(x)$, where $I(x)$ is instantaneous intensity of an area of the fringe pattern represented by the signal proportional to said movement of the balancing means, $\rho(x)$ is a relative displacement ratio, $I_0$ is the average light intensity and $I_1$ is the intensity amplitude of the variable term.

2. The combination of claim 1 including means for varying the area on said recording medium instantaneously covered by said one of the radiation beams.

3. A device for measuring intensity distribution of radiation passing through a moire fringe pattern recorded on a recording medium having a nonlinear intensity recording response comprising, a source of radiation, means establishing two radiation paths for beams originating from said source, photosensing means alternatively energized by radiation simultaneously transmitted by said two beams from said source, means displacing said recording medium in intersecting relation to one of said radiation paths for scanning the recorded moire fringe pattern between spaced locations on the recording medium, attentuating means intersecting the other of the radiation paths for varying the intensity of the radiation transmitted to the photosensing means in accordance with the nonlinear intensity recording response of the recording medium selectively operable means intersecting said other of the radiation paths for initially equalizing the intensities of the radiation transmitted to the photosensing means from said two beams, balancing means connected to the attenuating means for movement thereof to vary the intensity of the radiation transmitted along said other of the radiation paths in response to detection by the photosensing means of changes in intensity of radiation transmitted and means connected to the balancing means and the displacing means for producing output signals respectively representing said movement of the balancing means and displacement of the recording medium, said attenuating means comprising an optical reference wedge, a sample of said recording medium being incorporated in said wedge rendering the output signal from the balancing means a linear function of the intensity of the radiation passing through the moire fringe pattern, and means connecting the optical reference wedge to the balancing means for angular movement.

4. The combination of claim 3 including means for varying the area on said recording medium instantaneously covered by said one of the radiation beams.

5. The combination of claim 4 wherein said balancing means for angular movement about a rotational axis, said selectively operable means including another optical wedge manually rotatable about said rotational axis in close axially spaced relation to the first-mentioned reference wedge.

6. The combination of claim 3 wherein said selectively operable means including another optical wedge manually rotatable about said rotational axis in close axially spaced relation to the first-mentioned reference wedge.

7. A device for measuring density distribution of a medium comprising a source of radiation, means establishing two radiation paths for beams of equal intensity simultaneously originating from said source, photosensing means alternatively energized by radiation transmitted thereto from said source, means displacing said medium in intersecting relation to one of said radiation paths for scanning the medium between spaced locations thereon, attenuating means intersecting the other of the radiation paths for varying the intensity of the radiation transmitted along the other of the radiation paths to the photosensing means, selectively operable means intersecting said other of the radiation paths for initially equalizing the intensities of the radiation transmitted to the photosensing means, balancing means connected to the attenuating means for movement thereof to vary the intensity of the radiation transmitted along said other of the radiation paths in response to detection by the photosensing means of changes in intensity of radiation transmitted along said one of the radiation paths, and means connected to the balancing means and the displacing means for producing signals respectively proportional to said movement of the balancing means and displacement of the recording medium.

8. The combination of claim 7 wherein said attenuating means comprises an optical reference wedge incorporating a sample of said medium, and means connecting the optical reference wedge to the balancing means for angular movement about a rotational axis, said selectively operable means including another optical wedge manually rotatable about said rotational axis in close axially spaced relation to the first-mentioned reference wedge.

9. The combination of claim 8 including means for varying the area on said recording medium instantaneously covered by said one of the radiation beams.

10. The combination of claim 7 including means for varying the area on said recording medium instantaneously covered by said one of the radiation beams.

11. Apparatus for retrieving information from a photographic film on which a predetermined image pattern is recorded comprising means simultaneously establishing two beams of radiation, means for continuously displacing said film in intersecting relation to one of the beams at a predetermined rate of movement, photosensing means receiving radiation transmitted by said one of the beams through the film, attenuating means intersecting the other of the beams for instantaneously varying the intensity of radiation transmitted by the other of the beams to the photosensing means, balancing means connected to the photosensing means for regulating the attenuating means to equalize the intensity of radiation transmitted by said beams to the photosensing means, signal generating means connected to said film displacing means and the balancing means for producing an output signal representing variation in radiation intensity of said one of the beams after passing through the film as a function of said movement of the film, and film response compensating means mounted by the attenuating means for rendering the output signal proportional to input distribution of radiation intensity associated with said predetermined image pattern, said film response compensating means comprising a sample of said film exposed under conditions identical to those under which the image pattern is recorded.

References Cited

UNITED STATES PATENTS

| 2,478,406 | 8/1949 | Lamb. | |
| 2,547,212 | 3/1951 | Jamison et al. | 250—204 X |
| 2,594,514 | 4/1952 | Sweet | 250—204 X |
| 2,834,247 | 5/1958 | Pickels. | |
| 3,053,987 | 9/1962 | Cook et al. | |
| 3,096,137 | 7/1963 | Silard. | |
| 3,193,687 | 7/1965 | Hatcher | 250—229 X |
| 3,328,587 | 6/1967 | Brown et al. | 250—218 |

ARCHIE R. BORCHELT, Primary Examiner

C. M. LEEDOM, Assistant Examiner

U.S. Cl. X.R.

250—204, 220, 229